(12) United States Patent
Schmüdderich et al.

(10) Patent No.: US 8,903,588 B2
(45) Date of Patent: Dec. 2, 2014

(54) METHOD AND SYSTEM FOR PREDICTING MOVEMENT BEHAVIOR OF A TARGET TRAFFIC OBJECT

(75) Inventors: Jens Schmüdderich, Rodgau (DE); Sven Rebhan, Obertshausen (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 63 days.

(21) Appl. No.: 13/525,496

(22) Filed: Jun. 18, 2012

(65) Prior Publication Data
US 2013/0054106 A1 Feb. 28, 2013

(30) Foreign Application Priority Data

Aug. 22, 2011 (EP) .................................. 11178252

(51) Int. Cl.
*G08G 1/16* (2006.01)
*G06F 7/00* (2006.01)
(Continued)

(52) U.S. Cl.
CPC ....... *B60W 30/0956* (2013.01); *G06K 9/00805* (2013.01); *G06K 9/6293* (2013.01); *B60W 50/0097* (2013.01); *B60W 30/16* (2013.01); *Y02T 10/84* (2013.01)
USPC .............................. 701/23; 701/96; 701/301

(58) Field of Classification Search
CPC .................. B60W 50/0097; B60W 2750/306; B60K 31/0008; B60K 31/0083; G08G 1/0133; G08G 1/0104; G01S 13/58; B60T 2201/022; G06K 9/00798; G06K 9/00805
See application file for complete search history.

(56) References Cited

U.S. PATENT DOCUMENTS 8,340,883 B2* 12/2012 Arbitmann et al. ............. 701/96
2004/0030499 A1* 2/2004 Knoop et al. .................. 701/301
(Continued)

FOREIGN PATENT DOCUMENTS

| EP | 1898232 A1 | 3/2008 |
| EP | 1990788 A1 | 11/2008 |
| EP | 2172919 A1 | 4/2010 |

OTHER PUBLICATIONS

Technical Committee ISO/TC 204, Intelligent transport systems—Adaptive Cruise Control systems—Performance requirements and test procedures; ISO15622:2010(E), Second Edition, Dated Apr. 15, 2010, Switzerland, pp. 1-25.
(Continued)

*Primary Examiner* — James Trammell
*Assistant Examiner* — Demetra Smith-Stewart
(74) *Attorney, Agent, or Firm* — Squire Patton Boggs (US) LLP

(57) ABSTRACT

A method for computationally predicting future movement behaviors of at least one target object can have the steps of
producing sensor data by at least one sensor physically sensing the environment of a host vehicle, and
computing a plurality of movement behavior alternatives of a target object sensed by the sensor(s).
The context based prediction step uses a set of classifiers, each classifier estimating a probability that said sensed target object will execute a movement behavior at a time. The method can also include
validating the movement behavior alternatives by a physical prediction comparing measured points with trajectories of situation models and determining at least one trajectory indicating at least one possible behavior of the traffic participant,
estimating at least one future position of the traffic participant based on the at least one trajectory, and
outputting a signal representing the estimate future position.

15 Claims, 4 Drawing Sheets

(51) Int. Cl.
*G06F 17/10* (2006.01)
*B60W 30/095* (2012.01)
*G06K 9/00* (2006.01)
*G06K 9/62* (2006.01)
*B60W 50/00* (2006.01)
*B60W 30/16* (2012.01)

(56) References Cited

U.S. PATENT DOCUMENTS

| | | | |
|---|---|---|---|
| 2008/0097699 A1* | 4/2008 | Ono | 701/300 |
| 2009/0076702 A1* | 3/2009 | Arbitmann et al. | 701/96 |
| 2010/0017180 A1* | 1/2010 | Randler et al. | 703/8 |
| 2010/0036578 A1* | 2/2010 | Taguchi et al. | 701/93 |
| 2010/0207762 A1* | 8/2010 | Lee et al. | 340/541 |
| 2010/0228419 A1 | 9/2010 | Lee et al. | |
| 2011/0071964 A1* | 3/2011 | Horvitz | 706/12 |
| 2011/0246156 A1* | 10/2011 | Zecha et al. | 703/6 |
| 2012/0083960 A1* | 4/2012 | Zhu et al. | 701/23 |

OTHER PUBLICATIONS

I. Dagli et al, "Cutting-in vehicle recognition for ACC systems towards feasible situation analysis methodologies," in Intelligent Vehicles Symposium, Jun. 2004, pp. 925-930.

M. Reichel et al, "Situation Aspect Modelling and Classification Using the Scenario Based Random Forest Algorithm for Convoy Merging Situations," in Proc. IEEE Intelligent Transportation Systems, 2010, pp. 360-366.

B. Hammer et al, "Generalized Relevance Learning Vector Quantization", in Neural Networks, 2002, 15, pp. 1059-1068.

A. Broadhurst et al, "Monte Carlo Road Safety Reasoning" Intelligent Vehicles Symposium, 2005.

European Search Report for EP Application No. 11178252.0, Dated Feb. 28, 2012.

* cited by examiner

METHOD AND SYSTEM FOR PREDICTING MOVEMENT BEHAVIOR OF A TARGET TRAFFIC OBJECT

The present invention relates to the field of automated, computerized driver assistance in air, land or sea vehicles, where a sensor of a host vehicle physically senses the environment of the host vehicle, and a computing unit, supplied with an output signal of the sensor, computes a signal which assists in the guidance of the host vehicle when supplied to optical or acoustical indication means and/or when being supplied to an actuator of the vehicle. The actuator of the vehicle might be a safety device (airbag, . . . ) or an actuator influencing the movement of the vehicle (flaps, brakes, accelerator, steering, . . . ).

Driver assistance systems such as "Adaptive Cruise Control" (ACC) systems (e.g. described in ISO-Norm 15622:2010) increase driver comfort and safety. They are especially used for carrying out longitudinal control of a host vehicle, for example with respect to a velocity specified by the driver and ranging to other traffic objects such as other land, air or sea vehicles (cars, motorbikes, bikes, trucks, etc.), pedestrians, . . . . The host vehicle is provided with ("hosts") a sensor physically sensing the host vehicle's environment and a computing unit processing an output signal of the at least one sensor.

A problem of state of the art driver assistance systems reside in their reaction to lane-changes of target objects cutting-in to the host-vehicle's lane or cutting-out from host-vehicle's lane. A target object is a vehicle in the environment of the host vehicle and physically sensed by one or more sensors of the host vehicle.

The cutting-in problem in this sense means that the driver assistance system reacts delayed after a target vehicle crossed a lane-marking towards the lane of the host-vehicle. The cutting-in leads to a change in the safety distance between the host-vehicle and the target vehicle. Due to the ISO norm 15622:2010 a slow deceleration of the host-vehicle (especially below 3.5 m/s$^2$) is required. For this reason, in case of a cutting-in vehicle, the deceleration of the host-vehicle is too slow, which frequently results in under-runs of the safety distance. Thus the host-vehicle's driver needs to intervene, e.g. by manually braking and/or steering the host-vehicle.

On the other hand, the cutting-out problem means that the driver assistant system reacts delayed after a target vehicle crossed a lane-marking from the lane of the host-vehicle towards another lane. The ISO-norm 15622:2010 in this scenario requires that the host-vehicle accelerates slowly (especially below 2.0 m/s$^2$) which e.g. prevents a quick overtaking of the cut-out target vehicle, i.e. the target vehicle that crossed a lane-marking from the lane of the host-vehicle towards another lane. Thus, a re-cut-in of the cut-out target vehicle is possible, i.e. it is possible that a target vehicle that left the lane of the host-vehicle uses the increased distance to re-enter the host-vehicle's lane. Thus the driver needs to intervene to decrease the distance (e.g. between the host-vehicle and the target object (vehicle etc.) on a parallel lane or between the host-vehicle and another vehicle on the host-vehicle's lane) by accelerating manually.

It is hence an object of the invention to provide a method and system capable of alleviating the above problems.

In order to solve the above problem, the invention targets at predicting the target object's movement behavior before it actually performs a cutting-in or cutting-out maneuver. The prediction allows the host vehicle to either decelerate earlier and thus longer preventing under-runs of the safety distance or to accelerate earlier and thus allow for quicker overtaking process, or both.

Predicting the target object's future movement behavior is important as this prediction is important for scene understanding, i.e. the computed basis for decision making in the host-vehicle by the driver assistance system. Contributions to this basis can be made by sensors such as cameras, Radar, Lidar, and/or other sensors capable of deriving information from the host vehicle and especially its environment. The prediction hence helps to obtain fundamental rules for a setting the host-vehicle is part of.

Prediction is also crucial for systems, such as driver assistance systems, acting in dynamic environments. This is due to the fact that the sensors used do often deliver imperfect data. A temporal integration is therefore required to filter the imperfect data before the system can act, thus delaying the system response. However, in dynamic environments safe acting means early acting and this requires prediction.

The general aim of the invention thus is increase safety and comfort of the driver and host-vehicle using the prediction. It is clear, that the invention relates to a driver assistance system employing prediction, as well as a vehicle equipped with such a driver assistance system.

STATE OF THE ART

The prediction of movement behaviors of vehicles is known as such:

EP 1 867 542 teaches the detection of a lane-change behavior for switching a lane-keeping assistant on and off based on a turn signal that specifies target lane (left or right), a TTC (Time To Contact) to preceding vehicles, a TTC to trailing vehicles on the target lane, an existence check for the target lane, and lane-markings allowing to cross over to target lane (e.g. a dashed line).

EP 1 388 017 B1 teaches the detection of a lane-change maneuver based on a relative angular-rate between the host— and the target vehicle(s).

In US 2010/0076685 A1 a path (sequence of positions) is predicted for the host-vehicle, assuming that other vehicles do not change their behavior. More concretely, all other traffic-participants are assumed to move with constant velocity, and alternatives for different paths of the host-vehicle are computed, including paths for passing each of the other traffic-participants either to the left or to the right. Subsequently the path with the minimal risk is selected.

In the document "Cutting-in vehicle recognition for ACC systems—towards feasible situation analysis methodologies" by I. Dagli et al (reference [5]), a behavior of others is predicted based on lateral movement and position, matching of trajectories and the availability of fitting gaps.

In the document "Situation Aspect Modelling and Classification Using the Scenario Based Random Forest Algorithm for Convoy Merging Situations" (reference [6]) by Reichel et al classifications using Random Forrest Trees are used to evaluate lateral evidence and general scene context (traffic density).

Shortcomings of These Approaches

In references [2,3,5] behaviors are recognized and assigned to discreet classes. That means that these approaches can predict that, for example, a cutting-in maneuver will occur. However, they cannot provide the future position of a target over time, which is the information required for controlling a vehicle.

By design, none of the. above approaches can predict a behavior before it starts, because they all rely on physical observations of the behavior. For a cutting-in vehicle the earliest point of discriminating this behavior from the others is exemplary shown in FIG. 1 from the perspective of the host-vehicle. FIG. 1 visualizes the earliest point of behavior discrimination from the remaining behaviors with conventional approaches relying on physical observations/evidence, such as a vehicle's lateral offset to the lane or lateral velocity. This does not give the host-vehicle sufficient time to react.

The method of [4] predicts positions, but only for the host-vehicle. Applying this technique to the prediction of other vehicles is computationally exhaustive, because spanning the room of all possible behavior alternatives for all detected traffic-participants and computing their paths results in a runtime which scales exponentially with the number of detected traffic-participants.

In general, prior art approaches rely on direct, physical evidence (lateral position & velocity). While this is necessary for accurate trajectory prediction, most behaviors can only be physically discriminated too late which limits the applicability of existing approaches.

SUMMARY OF INVENTION

The invention hence solves the above problem by the system and method according to the independent claims.

Further aspects of the invention are now described with reference to the figures.

The invention disclosed herein separates the context based prediction or recognition of a movement behavior, i.e. the determination of "what" will happen (context based prediction), from a physical prediction, i.e. the determination of "how" it will happen. While context based prediction uses at least indirect indicators, the physical prediction uses direct indicators, as defined below.

The computerized context based prediction therefore employs principles that are also used by humans to predict traffic behavior. In particular, the inventive approach acknowledges the fact that relations between traffic participants are evaluated to obtain key indicators to predict behaviors. Relations can e.g. be physical or symbolic.

A physical relation describes the relative position and movement between two or more traffic participants. An indicator based upon a physical relation thus evaluates e.g. the relative position and velocity to compute a value characteristic for a special movement behavior.

For example if a target vehicle turns into a driveway and crosses a sidewalk in doing so, there is a physical relation between this target vehicle and a potential pedestrian on the sidewalk. An indicator evaluating this relation could e.g. output a value characteristic for the movement behavior "breaking" if the target-vehicle would hit the pedestrian if both continued their current movement. On the other hand the indicator could output a value characteristic for the movement behavior "turning" if there is no pedestrian nearby.

A symbolic relation describes a rule between one or more traffic participants and one road infrastructure element, such as e.g. traffic-lights, signs, and road/lane markings. An indicator based upon a symbolic relation evaluates e.g. the state of a road-infrastructure element and its applicability to a target object to compute a value characteristic for a special movement behavior.

For example if a vehicle is driving on the speed lane and approaching a no-passing sign, there is a symbolic relation between the sign and the vehicle. An indicator evaluating this relation could output a value characteristic for the movement behavior "lane-change-right" if the sign is applicable to the vehicle.

Evaluating all possible relations in complex scenes is not feasible as such a prediction would not scale well. The invention solves this problem by using expert knowledge to represent only relevant relations. E.g. for a lane-change of a target vehicle to a target lane only heading and tailing vehicles on the target-vehicle's lane and the target lane are considered. These representations are also called "local representations" and they scale linear with the number of target traffic participants, because for each target vehicle the number of relations is constant.

Figure 1:
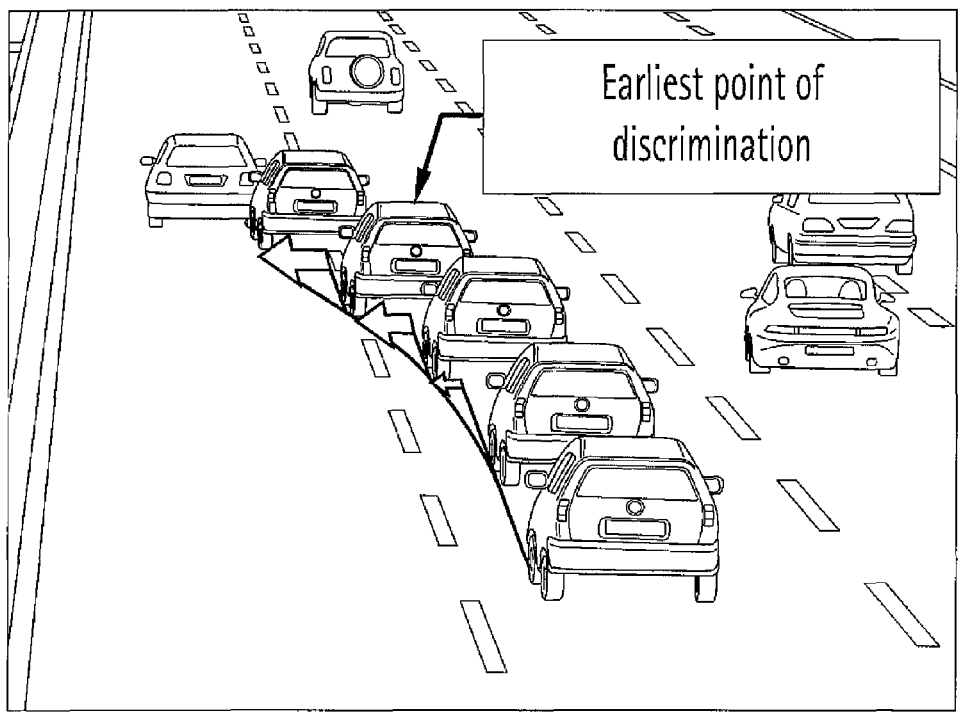
FIG. 1 exemplary shows the earliest point of discriminating a behavior from others for a cutting-in target vehicle.
Figure 2:
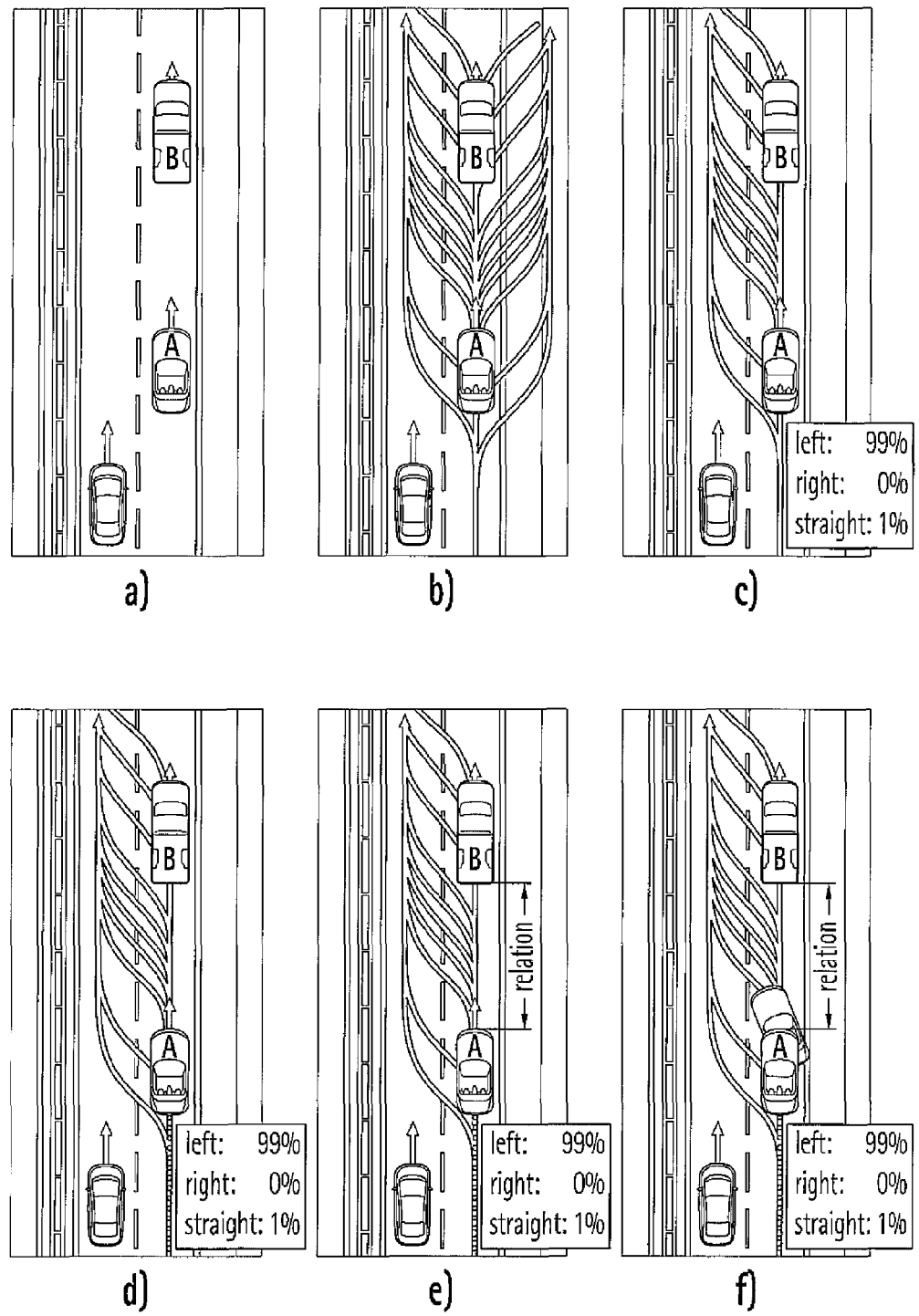
FIG. 2a-f shows exemplary an initial situation and the reduction of the set of potential trajectories for vehicle A FIG. 3 exemplary visualizes three situation models.
Figure 3:
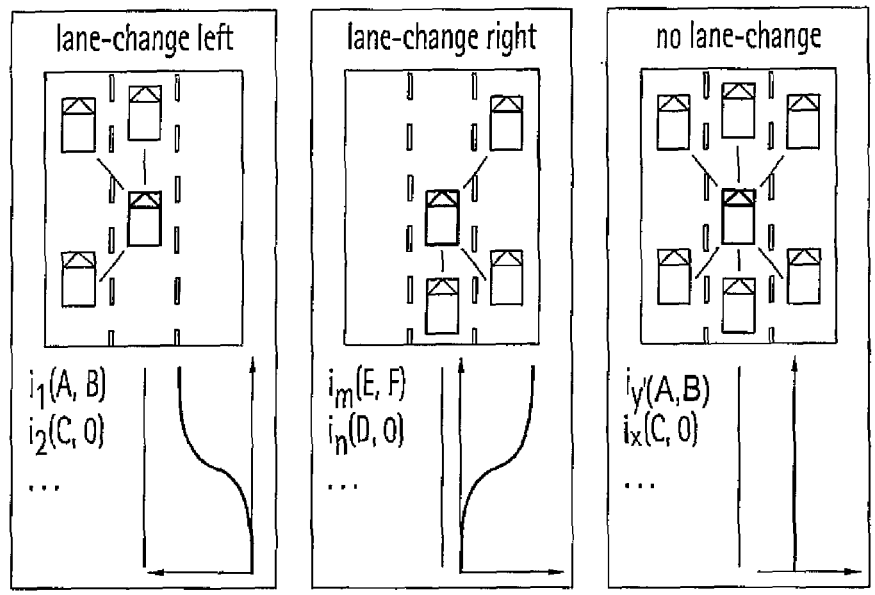
Figure 5:
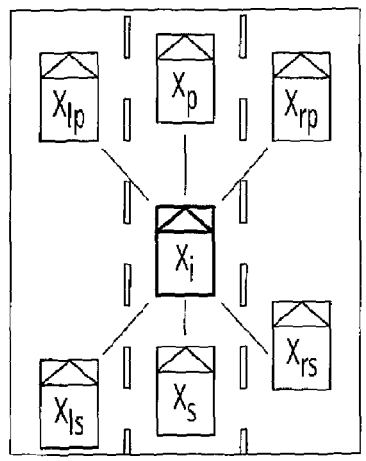
FIG. 5 visualizes the notation for vehicles

The computerized physical prediction determines a set of likely trajectories for each target vehicle. In FIGS. 2a-2f it is exemplarily shown how this can be achieved. FIG. 2a depicts a situation, in which it should be predicted how target-vehicle A changes the lane. FIG. 2b shows a set of all possible trajectories. By using the predicted movement behaviors from context based prediction the set of trajectories can be significantly reduced as shown in FIG. 5c. Matching a model against the history of perceived positional data in physical prediction helps to further reduce possible trajectories (FIG. 2d), as does using vehicle relations and/or using statistics (FIGS. 2e and 2f).

Definitions $x_i^t$: traffic object i at time t with $$x_i^t = (p_{i,x}^t, p_{i,z}^t, v_{i,x}^t, v_{i,z}^t, a_{i,x}^t, a_{i,z}^t)^T,$$

$p_{i,r}^t$: $p_{i,z}^t$ being the lateral and longitudinal position, $v_{i,r}^t$, $v_{i,z}^t$ being the lateral and longitudinal velocity, and $a_{i,r}^t$, $a_{i,z}^t$ being the longitudinal and lateral acceleration of traffic object i at time t.

$S^t$: scene at time t, consisting of all perceived traffic objects and road environment (lanes, lane-markings, traffic signs, traffic-lights, etc.) at time t.

B={b}: set of behaviors a traffic object ("participant") can perform. In the following $b_i^t \in B$ will be used to denote the behavior traffic participant $x_i^t$ is performing at time t.

DETAILED DESCRIPTION OF THE INVENTION

The inventive system and method is now described in view of the figures.

The method according to the invention assumes to be performed on/by the host-vehicle or a respective computing system on board of the host-vehicle being equipped with one or more sensors.

The computing system relates to a system for performing the necessary computing or calculation operations. This system may be specially constructed for this purpose, or it may comprise at least a general-purpose computer selectively activated or reconfigured by a computer program stored in the computer. The computing system can also consist of a network of (different) processors.

Such a computer program and also data required for its execution may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Furthermore, the computer referred to may include a single processor or may be architectures employing multiple processor designs for increased computing capability.

The computing system is especially functionally connected to the at least one sensor. The inventive method can be applied in form of a computer program. It can be stored on a computer readable medium and is executed when run on the computing system.

The at least one sensor can be e.g. a visual sensor (e.g. a camera, a laser scanner, infra-red camera, . . . ) and/or an acoustical sensor (e.g. a microphone, a radar, an ultrasonic sensor, . . . ).

The at least one sensor according to the invention is especially configured to detect other traffic-participants, especially vehicles, and to measure their location and velocity.

In addition the sensor can detect road infrastructure elements, such as traffic-lights, signs, and road/lane markings. The at least one sensor is also configured to estimate their location and state, where the definition of state depends on the type of infrastructure element. (There are known approaches for the skilled person for detecting traffic signs, etc. based on camera-images and/or navigation-data.)

For example a traffic-light can be in at least one of the states of displaying a signal (such as green, yellow, red) or out-of-order. A traffic-sign can be assigned to a class of traffic-signs, such as no-passing sign, speed-limitation, etc. Road-markings states may indicate curvature and type of lane and can e.g. be dashed, solid, or one-sided dashed.

The at least one sensor can also be configured to receive messages from inter-vehicle communication and/or to estimate target-vehicles' positions, velocities, accelerations, and further states (car-to-car-communication). Additionally this sensor can receive messages from infrastructure-communication to estimate position and state of road environment (car-to-infrastructure-communication).

The at least one sensor according to the invention is especially configured to estimate the host vehicle's position, velocity, and acceleration.

Of course it is also possible to use different and specific sensors for some or all of the above tasks. E.g. a GPS can be used for obtaining positioning information, while an accelerometer can be used to get information on the acceleration. Also a plurality of visual and/or acoustical sensors can be used to obtain information on the environment of the host-vehicle, e.g. to determine the positions of the other traffic participants and/or the state of the road infrastructure elements.

The presented method assesses the future location of one or more traffic-participants, hereafter referred to as target object(s).

In particular, the invention proposes a two-step approach for the prediction of target vehicle's future positions.

In the first step, the probability for each target vehicle to perform one of a set of possible movement behaviors is estimated by the so called context based prediction as explained below.

Subsequently, some or all of these movement behaviors are validated by means of a physical prediction as also detailed below.

The purpose of this physical prediction is twofold: First, it validates the set of possible trajectories against a combination of the results of the context based prediction, the physical evidence, and vehicle relations. Second, it estimates the future position of each vehicle.

In a final step a mismatch detection step analyzes the consistency of the physical prediction and the context based prediction. This is also detailed in the following.

The context based prediction, physical prediction, and mismatch detection can be encapsulated in situation specific models and can be performed by different hardware units within the driver assistance system. Suited models fitting to the vehicle's environment can be activated or deactivated based on environment perception or self localization. This aspect is further described below.

Indicators

We define indicators $$I = \bigcup_j I_j(.)$$

as a set of functions $$I_j(x^t, S^t) = (v_j, c_j) \qquad (1)$$

where $v_j$ is measurable variable conveying information about the future or ongoing behavior of a target vehicle and $c_j$ a confidence about the true-state of the variable $v_j$. The confidence $c_j$ is obtained by combining the sensor-confidence of all elements of $S^t$, which have been evaluated for the computation of $v_j$, where the sensor confidence is a value for the reliability of the sensed information. Without loss of generality indicators can be defined such that $v_j \in [0,1]$, i.e. the values are normalized between 0 and 1 e.g. by means of a Fermi-function. Such a normalization is useful for the combination of indicators as described below.

It is differentiated between direct and indirect indicators.

Direct Indicators $I_D \subset I$:

Direct indicators provide variables, which are observable if and only if the behavior to be detected has started. E.g. for predicting a lane-change, direct indicators are lateral velocity, lateral position relative to the lane, changing orientation relative to the lane, or changing orientation relative to other traffic participants.

Orientations as such are always observable, but the change of orientation can only be observed when the vehicle is changing lanes, because then it is rotating around the yaw-axis. A position change is detected, because the lateral velocity is the change of lateral position over time.

Indirect Indicators $I_I \subset I$:

Indirect indicators provide variables, which are already observable before the predicted behavior starts. We define indirect indicators as the set of all possible indicators without the set of direct indicators:

$$I_I = I \setminus I_D \qquad (2)$$

There are two types of indirect indicators:
1. The first type of indicators relates to information about a relation between at least one traffic participant and one or more other traffic participants or static scene elements.
   For example at least one of the following indicators can be available:
   fitting-left-gap: $l_{fitting\text{-}left\text{-}gap}(x_i^t, S^t)$ provides a value $v_{fitting\text{-}left\text{-}gap} \approx 1$ if a gap fitting to $x_i^t$'s position, velocity, and length is now or soon available on the left lane. Let $x_{ip}^t$ depict the predecessor of $x_i^t$ on the left neighboring lane of $x_i^t$, and let $x_{is}^t$ depict the successor of $x_i^t$ on the left neighboring lane of $x_i^t$. This notation is displayed in FIG. 5.

Figure 4:
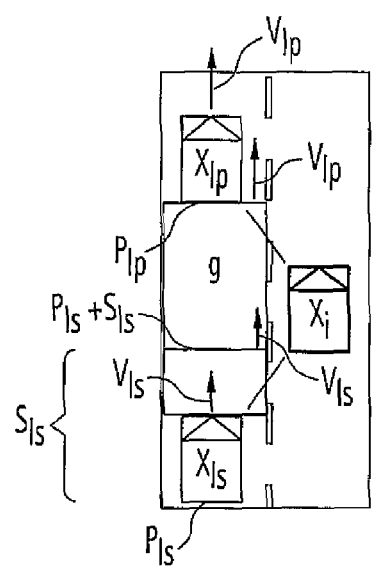
FIG. 4 visualizes vehicles relevant to estimate a gap g.

Then a gap is defined by a frontal position, a rear position, a frontal velocity, and a rear velocity. The frontal position and frontal velocity equal those of $x_{ip}^t$, the rear velocity equals that of $x_{is}^t$. The rear position equals that of $x_{is}^t$, plus the length of $x_{is}^t$ and a speed-dependent safety-margin. If $x_{ip}^t \notin S^t$, i.e. $x_i^t$ has no left predecessor, then the frontal position and velocity are set to infinity. If $x_{is}^t \notin S^t$, i.e. $x_i^t$ has no left successor, then the rear position and velocity are set to zero. The definition of a gap g is displayed in FIG. 4, which visualizes vehicles relevant to estimate the gap.

The fitting of a gap g to a vehicle $x_i^t$ can be determined by multiple factors:
  The ratio of the length of $x_i^t$ and the gap size,
  the longitudinal TTC (Time To Contact) of $x_i^t$ with the gap's frontal border, defined as the longitudinal TTC between $x_i^t$ and $x_{ip}^t$, with the longitudinal TTC defined as $$ttc_z(x_i^t, x_j^t) = (p_{i,z}^t - p_{j,z}^t)/(v_{j,z}^t - v_{i,z}^t) \quad (3)$$

the longitudinal TTC of xl with the gap's rear border, and
  the time when the gap is available, the so called "Time To Gap" (TTG). If $x_i^t$ is behind the gap g, then the TTG equals the longitudinal TTC to the gaps rear border. If $x_i^t$ is ahead of g, the TTG equals the longitudinal TTC to the frontal gap border. If the gap is available now, then the TTG equals zero.

fitting-right-gap: In analogy $l_{fitting-right-gap}(x_i^t, S^t)$ provides a value $v_{fitting-right-gap} \approx 1$ if a fitting gap is available on the right neighboring lane of $x_i^t$. Here the gap is defined by the predecessor $x_{rp}^t$ and successor $x_{rs}^t$ on the right lane.

approaching-predecessor: The indicator $l_{approaching-predecessor}(x_i^t, S^t)$ provides a value $v_{approaching-predecessor} \approx 1$ if $x_i^t$ is approaching a nearby predecessor on its own lane. This is derived from the longitudinal TTC between $x_i^t$ and its predecessor.

tailgating: $l_{tailgating}(x_i^t, S^t)$ creates a value $v_{tailgating} \approx 1$ if $x_i^t$ is tailgating its predecessor on its own lane. This is computed by the ratio of the longitudinal distance between $x_i^t$ and its predecessor, divided by the velocity-depended safety-distance.

evade-to-gap: $l_{evade-to-gap}(x_i^t, S^t)$ creates a value $v_{evade-to-gap} \approx 1$ if $x_i^t$ is approaching its predecessor on its own lane and if a fitting gap is or will be available before $x_i^t$ collides with its predecessor. This is computed by the difference between the longitudinal TTC and TTG, in combination with the indicators $l_{approaching-predecessor}(\cdot)$ and $l_{fitting-left-gap}(\cdot)$, where (.) is a placeholder for an arbitrary argument.

accelerate-to-gap: $l_{accelerate-to-gap}(x_i^t, S^t)$ creates a value $v_{accelerate-to-gap} \approx 1$ if $x_i^t$ is accelerating (or breaking), and if this acceleration is necessary to better fit to a gap's position or velocity (i.e. the gap is moving due to the movement of the predecessor and successor on the left or right neighboring lane with their velocity). This is evaluated by computing the TTC considering the gap's and the $x_i^t$'s acceleration and combining the results with the above indicator accelerate-despite-ttc: $l_{accelerate-despite-ttc}(x_i^t, S^t)$ creates a value $v_{accelerate-despite-ttc} \approx 1$ if $x_i^t$ is accelerating faster than its predecessor, and if the TTC between the two is low.

successor-approaching: $l_{successor-approaching}(x_i^t, S^t)$ provides a value $v_{approaching-successor} \approx 1$ if $x_i^t$ is approached by a nearby successor on its own lane. This is derived from the longitudinal TTC between $x_i^t$'s successor and $x_i^t$.

free-lane: $l_{free-lane}(x_i^t, S^t)$ provides a value $v_{free-lane} \approx 1$ if the lane ahead of $x_i^t$ is free, i.e. if there is no predecessor of in the sensor range.

free-lane-and-let-overtake: $l_{free-lane-and-let-overtake}(x_i^t, S^t)$ provides a value $v_{free-lane-and-let-overtake} \approx 1$ if
  $x_i^t$ has no predecessor (indicated by $l_{free-lane}(\cdot)$) and there is a gap on the neighboring lane (indicated by $l_{fitting-right-gap}(\cdot)$) and
  $x_i^t$ has a successor $x_s^t$ on its lane, which is so fast, that $x_i^t$ can cut-out into g, $x_s^t$ can overtake, and $x_i^t$ can cut back in to its originating lane without the need to adapt its velocity to g. This part of the indicator is estimated by comparing the longitudinal TTC between $x_i^t$ and g and the TTG between $x_i^t$ and the gap built by $x_s^t$ and the successor of $x_s^t$.

traffic-signs: This group of indicators produce values $v_{traffic-sign} \approx 1$ if $x_i^t$ has to adapt its behavior to comply with a traffic-sign. E.g. speed-sign indicators, e.g. a speed limit-signs, produce a high value if $x_i^t$ is faster than indicated by the speed-sign. A no-passing sign produces a high value if $x_i^t$ is on the left-lane/speed-lane and if it is addressed by the no-passing sign.

lane markings: This group of indicators produce values $v_{lane-markings} \approx 1$ if $x_i^t$ has to adapt its behavior to comply with the lane-markings. E.g. a line-end indicator could produce a high value if $x_i^t$ is driving on a lane, which is about to end. Or a dashed-line indicator could produce a low value if $x_i^t$ is driving on a lane which does not permit lane-changes (solid lane).

combinations of the above: The indicators above can be recombined to create new indicators. E.g. $l_{fitting-left-gap}(.)$ can be combined with $l_{approaching-predecessor}(.)$ to an indicator which gives a high value if a gap is available and $x_i^t$ is approaching $x_p^t$. The combination is done in a way that a high value of one of the indicators can compensate for a medium value of the other indicator. This is achieved by a weighted summation of the two values.

$$v_{combined} = \min(1, w_1 v_{fitting-left-gap} + w_2 v_{approaching-predecessor})$$

with $$\sum_i w_i > 1.$$

2. The second type of indirect indicators convey information about the driver intention, actively communicated by the traffic participant whose behavior to be predicted. Examples are
  turning-signal: This indicator produces a high value if the target vehicle's turning signal is activated.
  breaking-light: This indicator produces a high value if the target vehicle's breaking light is activated.
  car-to-car-communication: This group of indicators can respond to communicated changes of the sending vehicle's velocity or heading.

As an alternative to the described indicators one could also use indicators which are not normalized to [0,1]. In particular, threshold values could be defined indicating whether an indicator is present or not. Therefore, when a threshold is exceeded, the respective indicator is deemed to be present.

Of course, also arbitrary combinations of the described or other indicators can be used in order to predict a behavior. In one aspect of the invention, indicators can be combined based on a statistical learning method, e.g. Learning Vector Quantization as described in [7].

In the following the system for prediction using context based prediction and physical prediction is described.

Context Based Prediction

Context based prediction consists of a set of classifiers $\Gamma^b = \{\gamma_j^b\} j=1 \ldots N_t$, where each classifier $\gamma_j^b$ estimates a probability $p(b_i^{t+\Delta t}|x_i^t, S^t, \gamma_j^b)$ that a target vehicle $x_i^t$ will execute behavior $b \in B$ at a time $t+\Delta t$. For each behavior $b$ a different set of classifiers can be used.

Here, B={lane-change-left, lane-change-right, follow-lane}. A feature-vector $f_{ji}^{bt}$ is computed for each $x_i^t$ and each classifier $\gamma_j^b$ based on the indirect indicators, where $$f_{ji}^{bt} = (f_{ji1}^{bt}, \ldots, f_{jiN_j}^{bt})^T \quad (4)$$

$$f_{jik}^{bt} = t_k(x_i^t, S^t), \quad (5)$$

$$\text{with } t_k(.) \in I_l^j \subset I_l. \quad (6)$$

The probability of $x_i^t$ performing behavior $b$ at time $t+\Delta t$ is the estimate:

$$p(b_i^{t+\Delta t} | x_i^t \cdot S^t) \propto \sum_{j=1}^{N_b} w_j p(b_i^{t+\Delta t} | x_i^t, S^t, \gamma_j^b) \quad (7)$$

$$p(b_i^{t+\Delta t} | x_i^t, S^t, \gamma_j^b = \gamma_j^b(f_{ji}^{bt}) \quad (8)$$

That means, for each behavior, the probability is estimated by a weighted combination of set of multiple classifiers, each using a different set of indicators.

To allow for early prediction before the start of the behavior, no direct indicators need to be used.

In consequence the context based prediction is capable of determining the class of the future behavior, but not the concrete execution in terms of time and space of the movement of $x_i^t$. In other words, the context based prediction can estimate the probability of each behavior $b \in B$ to happen roughly at time $t+\Delta t$, but the exact $\Delta t$ and position $p_{i,x}^{t+\Delta t}$, $p_{i,z}^{t+\Delta t}$ at time $t+\Delta t$, of $x_i^t$ are unknown.

Additionally or as an alternative to a context based prediction that does not use any direct indicators as described above, a classifier could be used, which dynamically includes direct and indirect indicators based on the prediction time $\Delta T$. For example, the classifier could use indirect indicators for $\Delta T > 2s$ and could fade to direct indicators for $\Delta T < 1s$.

Figure 6:
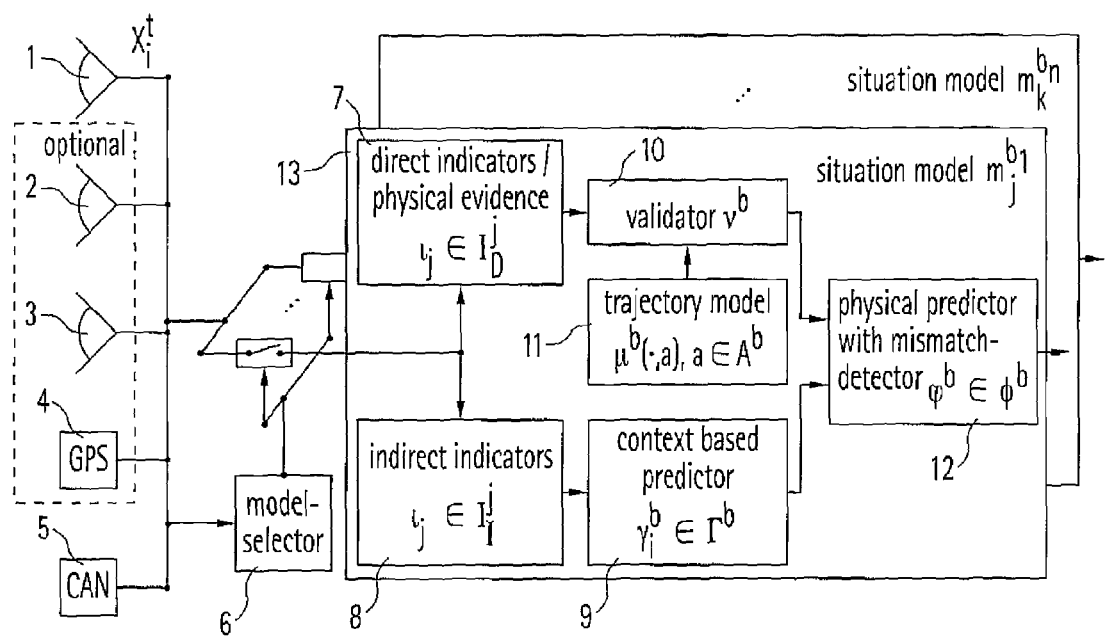
FIG. 6 provides an overview of the inventive system.

Different behavior classes require different indicators, dependent on the situation. This is addressed by using at least one situation model per behavior, wherein each model contains indicators and trajectory information. An example for three situation models ("lane-change left", lane-change right" and "no lane change") is visualized in FIG. 6. In FIG. 6, situation model "lane-change left" contains indicators $i_1(A,B), i_2(C,0), \ldots$, "lane-change right" contains indicators $i_m(E,F), i_n(D,0), \ldots$ and "no lane change" contains $i_x(A,B)$, $i_y(C,0), \ldots$.

A real world situation can require a plurality of situation models as can be seen from FIG. 7a and FIG. 7b. FIG. 7a shows real world scenarios, while FIG. 7b shows situation models. E.g. the upper left real world situation in FIG. 7a (in the frame) is represented by the four situation models in the upper left of FIG. 7b (in the frame).

Physical Prediction

Physical prediction compares measured points with trajectories in situation models. It determines a set of potential trajectories for action generation. It also can indicate when the context based prediction/behavior-recognition went wrong (self-validation).

The physical prediction uses a set of predictors $\Phi = \{\phi^b\}_{b \in B}$. $X_i^t = (x_i^{t-T}, \ldots, x_i^t)$ defines the history of the last T+1 states of traffic participant i.

Let $\mu(p_z, a) = p_x$ be a parametric trajectory model, returning a lateral position $p_x$ given a longitudinal position $p_z$ and a parameter-set a.

Let $A^b = \{a\}$ be a set of parameters for $\mu$, covering different trajectories for behavior b.

The task of a physical predictor $\phi^b(p_{i,x}^{t+\Delta t}, p_{i,z}^{t+\Delta t}, X_i^t, S^t)$ is to estimate the likelihood that $x_i^t$ will be at position $p_{i,x}^{t+\Delta t}$, $p_{i,z}^{t+\Delta t}$ at time $t+\Delta t$, given the history of states $X_i^t$ and the current situation $S^t$, for a behavior b. This likelihood is estimated by $$\phi^b(p_{i,x}^{t+\Delta t}, p_{i,z}^{t+\Delta t}, X_i^t, S^t) = v^b(p_{i,x}^{t+\Delta t}, p_{i,z}^{t+\Delta t}, X_i^t, S^t) p(b_i^{t+\Delta t}|x_i^t, S^t) \quad (9)$$

$v^b(\cdot)$ is a so-called validator function. It has the important property, that it returns value $\approx 1$ if it has no evidence indicating that $x_i^t$ will not be at point $(p_{i,x}^{t+\Delta t}, p_{i,z}^{t+\Delta t})$ at time $t+\Delta t$. Only if it has evidence indicating that $x_i^t$ will not be at that point does it return a value lower than 1. Consequently, the physical predictor $\phi^b(\cdot)$ relies on the context based prediction to predict if $x_i^t$ will perform behavior $b_i^{t+\Delta T}$, it only restricts the space, that is, the way how $x_i^t$ will perform this behavior.

The validator function validates the evidence by $$v^b(p_x, p_z, X_i^t, S^t) = \sum_{a \in A^b} \lambda_p(p_x, p_z, a) \lambda_h(X_i^t, a) \lambda_s(S^t, a) \quad (10)$$

$\lambda_p(p_x, p_z, a)$ estimates the likelihood for the point $(p_x, p_z)$ to lie on a trajectory modeled with parameter a. This is computed as:

$$\lambda_p(p_x, p_z, a) = \begin{cases} 1 & \text{if } p_x = \mu(p_z, a) \\ 0 & \text{otherwise} \end{cases} \quad (11)$$

$\lambda_h(X_i^t, a)$ computes the likelihood for the history $X_i^t$ to originate from a trajectory modeled with parameter a. This is estimated by $$\lambda_h(X_i^t, a) \exp = \left( -\frac{1}{2\sigma^2(T+1)^2} \sum_{\tau=0}^{T} (p_x^{t-\tau} - \mu^b(p_z^{t-\tau}, a))^2 \right) \quad (12)$$

$\lambda_s(S^t, a)$ computes the likelihood for the trajectory modeled with parameter a to comply with the current situation. This is based on statistics of how traffic participants conduct a specific behavior dependent on the other traffic participants behavior. Those parameters resulting in trajectories which lead to a high TTC to other traffic participants are favored over those, with a low TTC.

As an alternative to the equation (12) for computing the difference between the model and the measured positions, any other metric could be used.

Also, as an alternative to the parametric trajectory model $\mu$ of the physical prediction, a model-free approach could be chosen, e.g. potential fields.

Here, $\mu^b$ is the tanh-function and $a=(s_x, s_z, d_x, d_z)$, where $s_x$, $s_z$ are lateral and longitudinal stretching factors, and $d_x$, $d_z$ are lateral and longitudinal offset-factors, such that $$p_x = \mu^b(p_z, a) \quad (13)$$

$$\Leftrightarrow p_x = s_x \cdot \tanh(s_z \cdot (p_z - d_z)\pi) + d_x \quad (14)$$

Only the parameter $s_x$, accounting for the average lateral traveling distance while making a lane-change, depends on the behavior b. For b="lane-change-left", $s_x = -0.5$ w, where w is the lane-width. For b="lane-change-right", $s_x = 0.5$ w, and for b="follow-lane", $s_x = 0$. $s_z$ is set to a constant value using expert knowledge and accounts for the average longitudinal traveling distance while making a lane-change. $d_x$ is averaged from the last T lateral positions and is constant for all $b \in B$. $d_z$ is sampled equidistantly, i.e. $d_z$ is chosen from a set $(-M \cdot \Delta d_z, \ldots, -\Delta d_z, 0, \Delta d_z, \ldots, N \cdot \Delta d_z)$.

Consequently, in equation (10) for the computation of the validator function only the different longitudinal offsets need to be sampled.

Mismatch Detection

As described above, the physical prediction relies on the context based prediction to predict if $x_i^t$ will perform a behavior $b_i^{t+\Delta t}$, and, given this behavior, subsequently restricts the space $x_i^t$ will occupy.

To compensate for wrong classification of the context based prediction, a mismatch detection method is employed.

In principle the method works as follows: A mismatch between context based prediction and the result of the validator functions is detected. As context based prediction returns a probability for a behavior, the sum over all behaviors is 1:

$$\sum_b p(b_i^{t+\Delta t} \mid x_i^t, S^t) = 1 \quad (15)$$

If likelihood of all physical predictors for $x_i^t$ falls below a threshold $\Theta_p$ this can have two reasons:

Possibility 1: $x_i^t$ performs a behavior which does not match any of the behaviors in B. In this case, none of the validator functions will show a high value:

$$\forall_{b \in B} v^b(p_{i,x}^t, p_{i,z}^t, X_i^t, S^t) < \Theta_v \quad (16)$$

Possibility 2: there is a mismatch between validator functions and context based prediction. In this case, at least one of the validator functions will have a high value. Thus we define the mismatch criterion as $$\text{mismatch}(i) = \begin{cases} \text{true if} & \sum_b \varphi^b(p_{i,x}^t, p_{i,z}^t, X_i^t \cdot S^t) < \Theta_p \\ & \wedge \exists_{b \in B} v^b(p_{i,x}^t, p_{i,z}^t, X_i^t, S^t) \geq \Theta_v \\ \text{false otherwise} \end{cases} \quad (17)$$

The applicability of this mismatch detection is twofold:

If mismatch(i) is true, first, a fall-back method could be applied, which only relies on validator functions for predicting $b_i^{t+\Delta t}$. Second, a system failure could be communicated to the driver of the host-vehicle (true branch). Otherwise the original result of the physical prediction as defined in (9) is used (false branch).

The reason for a driver executing a certain behavior strongly depends on the situation the driver is in. For example, on a highway a driver will change lanes to overtake another vehicle, whereas at an inner-city intersection he will change lanes to reach a turn-lane.

In consequence, this means that indicators for context based prediction also strongly depend on the situation.

Also the execution, i.e. the way in which the behavior is executed, depends on the current situation. For example, on a highway the trajectory of a lane-change significantly differs from that in the inner-city, due to the different dynamics.

This is addressed by defining situation specific models for each behavior b, so called situation models $m_j^b$ defined as $$m_j^b = (\gamma_j^b, I_j^b, \mu^b, A^b) \quad (18)$$

Thus a situation model can be defined for each situation, in which traffic participants should be predicted. These situation models contain a specialized context based prediction $\gamma_j^b$, specialized indicators $I_j^b$, a specialized parametric model $\mu^b$ and a parameter-set $A^b$ fitting to the model.

As the computation of predictions in all available situation models is computationally too exhaustive, the required situation models can be preselected based on digital map information or sensory information by a model selector. For example, recognizing lane-markings, e.g. yellow lane markings, can activate special models to handle lane-change in a construction site. Map-data about an upcoming entrance or exit to the highway can activate models to handle lane-merging etc. Further, gps-positioning can be used to activate country specific rules, like a preferred lane for overtaking.

Situation Models can be ordered in a hierarchy based on generality. This hierarchy is defined as a set of nodes, where each node is either connected to exactly one parent node, or is the top-node. Situation models are contained in the nodes.

Exemplarily, the hierarchy can be built in the following way. On the top level, a discrimination between road category, such as highway, inner-city, and rural road can be made. At least one node for each of these categories can be created, containing the generic situation models for the respective category.

On the next level, a discrimination of situations within the category could be made. For example, child-nodes of innercity are intersection, zebra-crossing, traffic-light, etc.

On the lowest level, e.g. location specific situations may be described. For example situation models to describe the unique behavior at the arc-de-triumph in France could be represented.

Using a device for self-positioning, such as GPS, the situation models fitting to the current situation can be selected. In this way the prediction is limited to the relevant situation models.

In summary, the invention allows expanding the prediction horizon and thereby increases safety and comfort. The inventive approach uses three key characteristics:

The separation of context based prediction (situation recognition) (i.e. "what") and physical prediction (i.e. "how"). It applies recognition methods by evaluating local relations to other traffic participants and represents information in situation models.

FIG. 6 provides an overview of the inventive system for predicting traffic-participants behavior. In FIG. 6 reference numerals 1-5 denote sensor devices e.g. a device for detecting traffic participants 1 and/or estimating their speed and velocity; an optional device for detecting road infrastructure elements 2; an optional device for car-to-car communication 3; an optional device for self-localization 4 and/or a device for reading the host-vehicle's state 5. Further, FIG. 6 also shows a model selector unit 6 to activate required situation models. The computation of direct indicators 7 and physical evidence is also indicated. The figure also shows the computation of indirect indicators 8 and context based prediction 9 as described. A validation unit 10 employing the validator function is shown as well as a trajectory unit 11 providing the trajectory model. The physical predictor unit 12 is shown as well as the unit providing the situation.

It should be understood that the foregoing relates only to embodiments of the invention and that numerous changes and modifications made therein may be made without departing from the scope of the invention as set forth in the following claims.

References

[1] ISO-15622:2010, *Transport information and control systems—Adaptive Cruise Control systems—Performance requirements and test procedures*. ISO, Geneva, Switzerland, 2010. no. 15622:2010.

[2] M. Scherl, M. Weilkes, L. Buerkle, and T. Rentschler. "Lane keeping assistant with lane change function," Patent EP 1 867 542, 2007.

[3] H. Winner and J. Lueder, "Method for recognising a change in lane of a vehicle." Patent EP 1 388 017 BI, 2009.

[4] A. Eidehall. "System and method for assessing vehicle paths in a road environment." Patent. U.S. 2010/0 076 685 A1. March, 2010.

[5] I. Dagli, C. Breuel, H. Schittenhelm, and A. Schanz, "Cutting-in vehicle recognition for ACC systems—towards feasible situation analysis methodologies." in *Intelligent Vehicles Symposium*, Jun. 2004, pp. 925-930.

[6] M. Reichel. M. Botsch, R. Rauschecker, K.-H. Siedersberger, and M. Maurer. "Situation Aspect Modelling and Classification Using the Scenario Based Random Forest Algorithm for Convoy Merging Situations," in *Proc. IEEE Intelligent Transportation. Systems*, 2010, pp. 360-366.

[7] B. Hammer and T. Villmann, "Generalized Relevance Learning Vector Quantization", in *Neural Networks*, 2002,15,pp. 1059-1068.

The invention claimed is:

1. A method for computationally predicting future movement behaviors of at least one target object, said method comprising the steps of:
producing sensor data by at least one sensor physically sensing the environment of a host vehicle,
computing a plurality of movement behavior alternatives of a target object sensed by the sensor(s) for the same initial situation, by predicting movement behaviors of the target object applying a context based prediction step using indirect indicators derived from said sensor data, wherein said context based prediction step uses a set of classifiers for each movement behavior, each classifier estimating a probability that said sensed target object will execute a movement behavior at a time, wherein the probability is calculated based on a feature vector calculated for each classifier based on the indirect indicators, and wherein at least part of said indirect indicators relate to information about a relation between the target object and one or more other traffic participants,
validating the movement behavior alternatives by a physical prediction comparing measured points with trajectories of situation models and determining at least one trajectory indicating at least one possible behavior of the target object, wherein the at least one movement behavior is a sub-set of the possible movement behavior alternatives,
estimating at least one future position of the target object based on the at least one trajectory, and
outputting a signal representing the estimated future position.

2. The method of claim 1,
wherein the estimated future position signal is supplied to an actuator or display means of the vehicle.

3. The method of claim 1,
comprising a mismatch detection step detecting inconsistencies between the context based prediction and the physical prediction, and wherein based on the detected mismatch a fall-back vehicle operation function or a communication function for communicating information to a driver is activated.

4. The method of claim 3, wherein the fall-back vehicle operation function is a function that influences a vehicle's controls in a default or predefined manner.

5. The method according to claim 1, wherein a communication function signals the driver with an alarm or informs the driver on the current initial situation.

6. The method according to claim 1, wherein specific indicators are contained in the situation models and are used to find out how well a situation model matches to the current initial situation.

7. The method according to claim 1, wherein a situation model is activated based on the current initial situation identified by information at least partially derived from sensor data or based on self-localization information of the host vehicle.

8. A driver assistance system, designed for being mounted on a host vehicle and executing the method according to claim 1.

9. The driver assistance system according to claim 8, comprising at least one of
a device for detecting traffic objects or a device for estimating their position and velocity,
a device for detecting road infrastructure elements,
a device for car-to-car communication, and
a device for self-localization or a device for reading the host-vehicle's state.

10. The driver assistance system according to claim 8, further comprising a model selector unit selecting and activating situation models based on information at least partially derived from sensor data or based on self-localization information of the host-vehicle.

11. The driver assistance system according to claim 8, comprising a computing system computing direct indicators or computing indirect indicators and the context based prediction.

12. The driver assistance system according to claim 8, comprising a validation unit employing a validator function, a model unit providing a trajectory model or a predictor unit outputting the estimate.

13. The driver assistance system according to claim 8, wherein the driver assistance system comprises an Adaptive Cruise Control.

14. A computer software program product embodied on a non-transitory computer-readable medium, said product performing, when executed on a computer, the method according to claim 1.

15. A vehicle including a driver assistance system according to claim 8, wherein the driver assistance system influences controls of the vehicle based on the output estimate.

* * * * *